Patented Jan. 9, 1940

2,186,031

UNITED STATES PATENT OFFICE 2,186,031

PROCESS FOR TREATING HYDROCARBONS

Arthur L. Lyman, Berkeley, Calif., assignor to Standard Oil Company of California, San Francisco, Calif., a corporation of Delaware No Drawing. Application March 9, 1936, Serial No. 67,918

12 Claims. (Cl. 196—10)

This invention pertains to a process for the production of low-boiling liquids generally suitable for motor fuels from olefine hydrocarbons containing from 2 to 5 carbon atoms per molecule and more particularly to a process in which such olefines derived from petroleum are polymerized by an acidic catalyst at comparatively low temperatures.

With the development of the petroleum cracking art on a large scale enormous quantities of the normally gaseous olefines containing from two to five carbon atoms per molecule became available as low-cost raw materials. Numerous processes were developed for polymerizing these olefine gases to liquid motor fuels and especially to fuels of very high resistance to detonation when employed in engines having high compression ratios. While such processes relying entirely upon temperature-pressure-time relations maintained in the gas to effect polymerization have been widely advocated because of their simplicity of operation it was soon found that catalytic methods, wherein both the course of the polymerization reaction and its extent can be controlled to the very material advantage of the fuel produced, are usually preferable even though they may at first appear decidedly more complicated.

The strong acids of sulfur and phosphorus and certain of their salts appear to provide the most generally desirable catalysts for such gaseous olefine polymerization and much has already been accomplished in the perfection of specific catalysts within this broad group that are particularly adapted to meet the operating requirements of the industry. One such specific catalyst which is possessed of an especially desirable set of characteristics consists of a thin film of strong liquid phosphoric acid absorbed on the surface of a non-porous inert solid support such as broken glassy quartz. With these particular catalysts rather exact control of the extent of polymerization is possible, resulting in a maximum yield of any desired product and a minimum of over-polymerized products such as gums and tars to interfere with the further activity of the catalyst.

The phosphoric acid-film type of catalyst is also extremely rugged and substantially incapable of deterioration by disintegration which has been found to be a serious shortcoming in other solid catalysts of this general class. The low first cost of materials in such film type catalysts, in which acid equivalent to only about 3.5 pounds of phosphoric anhyride is employed per gross cubic foot of catalyst, constitutes another very considerable item to their credit. However, their most serious disadvantage appears also to be at least in part due to this same feature of low content of catalytically active material. This disadvantage consists in a rather rapid loss in catalytic activity which proved to be due to certain catalyst poisons which appear to be quite generally associated with gaseous olefines or at least with such as are produced in the cracking of petroleum oils. Its magnitude is such as to render these otherwise highly desirable catalysts substantially useless with the large bulk of gaseous olefines currently available.

It is the object of this invention to provide a simple and effective method of purifying olefine containing gases for catalytic polymerization.

It is a further object of this invention to provide a practical method of removing from petroleum cracking gases bodies which are active poisons for phosphoric acid polymerization catalysts.

It is the over-all object of this invention to provide a simple and efficient process for the catalytic polymerization of gaseous olefines to superior liquid motor fuels and at the same time one which shall not be limited in its applicability to olefines from any particular source.

Other objects of my invention will be apparent from the following description and discussion.

Phosphoric acid disposed in a thin film on a non-porous inert solid support such as broken, 10–20 mesh, glassy quartz shows a broad maximum catalytic activity, in polymerizing the normally gaseous olefines, between 95% and 115% $H_3PO_4$ corresponding to 68–83% $P_2O_5$. The more efficient catalysts of this type will thus comprise acid of about 100–110% $H_3PO_4$, 72.5–80% $P_2O_5$.

With such catalysts and the more reactive gaseous olefines such as isobutene polymerization becomes appreciable at temperatures as low as about 50° F. and atmospheric pressure and increases both in rate and degree with higher temperatures and pressures. At temperatures above 450° to 500° F. carbonization of organic material by phosphoric acid of this strength becomes sufficient that such temperature will usually constitute an upper practical limit for polymerization. The desirable temperature range for operation with any olefine or olefine mixture of from three to five carbon atoms to the molecule is thus from about 150° to 400° F. and will vary within that range with the particular gas or mixture employed.

In order to maintain an acid-film catalyst, in which the bulk of acid is relatively small, at substantially constant composition and hence constant polymerizing activity throughout the passage of large volumes of gas during a given operation it has been found necessary to control the humidity of the gas employed within a range determined by the partial water vapor pressure of permissible acid concentrations and the temperature of desirable operation.

In the early commercial development of catalysts of this type much irregularity in their operation was experienced. Since no comparable irregularity had been encountered in the laboratory it appeared that the difficulty must be ascribable to acid concentration changes resulting from improper humidity control in the much larger volumes of higher velocity entering gas. However, as control of this feature was effected with greater regularity it became apparent that important as it was, this was not the major factor responsible for the rapid losses of catalyst activity which were being experienced since they continued to occur even in the absence of any substantial changes in the water content of the catalyst.

With water, the most probable source of catalyst degradation, under control attention was turned to the other known components of cracked petroleum gases which might be expected to have an adverse effect on the activity of a polymerization catalyst. Provisions for the elimination of hydrogen sulfide and methyl mercaptan had already been taken since they had previously been found to exert a deleterious effect on the polymerizing activity of aluminum chloride for olefinic gases. Added precautions were, however, introduced and even when the sulfur content of the gases was reduced below the point of detection by the most sensitive analytical methods no improvement in catalyst operation was obtained.

While of only incidental significance in leading to the final discovery upon which this invention is based, it is at least of sufficient importance to the knowledge of catalytic olefine polymerization generally to mention in passing that it was eventually demonstrated that neither hydrogen sulfide nor methyl mercaptan have any appreciable effect upon the polymerizing activity of phosphoric acid and their elimination from a gas to be polymerized by that catalyst is significant only since they become fixed as difficultly removable components in the polymer product.

As is well known there are many instances in the broad field of chemistry where the merest traces of certain specific substances exert a powerful poisoning effect, apparently on highly active centers of catalytic activity such as particularly oriented surface molecules in heterogeneous catalysis or activated molecules of reactants in homogeneous chain reactions.

After the more probable sources of catalyst inactivation had been eliminated as hereinbefore recounted attention was given to the possibility that some similar poisoning action might here be responsible for the catalyst difficulties which were being experienced and it was eventually demonstrated that some substance is present in extremely small amount in a cracked petroleum gas which appears to exert just such a specific poisoning effect on the olefine polymerizing activity of a phosphoric acid-film type catalyst.

It was found that, all other factors remaining the same, by washing the gas from a petroleum cracking operation with a dilute aqueous solution of a strong acid, such for instance as a 5 to 10% solution of sulfuric acid, prior to adjusting its humidity and passing it to the polymerization step the active life of a phosphoric acid-film catalyst can be extended from a few hours to many hundreds of hours.

It was of course possible that the alkaline reacting material removed from the gas by such acid washing was effective in reducing the catalytic activity of the phosphoric acid-film catalysts merely through neutralization of acid which effect would become quickly apparent due to the small total amount of acid present and not at all due to any specific poisoning action. This however did not appear likely in view of the fact that no alkaline component is generally present in petroleum gases in sufficient amount to have previously been recognized. Experiments were accordingly performed to determine the quantity of basic material present and the mechanism by which it effects the activity of an acid-film catalyst.

In these experiments a butene-butane fraction containing 47% mixed butenes from a petroleum cracking operation was subjected to polymerization by passing it over a film-catalyst of phosphoric acid (approximately 100% $H_3PO_4$) on 10–20 mesh broken quartz at about 300° F., atmospheric pressure and a space velocity of about 1.0 (volume of gas at 70° F. and 1 atmosphere per volume of catalyst per minute). In experiment #1 no acid pretreatment of the gas was employed, while in experiments #2 and #3 the gas was thoroughly washed with aqueous 5% sulfuric acid. The quantity of basic reacting material removable was accurately determined by washing a known volume of gas with standard acid and back titrating. In experiment #3 an amount of dry ammonia equivalent to 250 times the amount of basic material so found was added to the washed gas and the polymerization was continued until the activity of the catalyst had fallen to approximately the same degree as reached in 114 minutes in experiment #1. The catalyst activity in each experiment is indicated in the following table by the percentage of the entering olefine which is being polymerized at the indicated time after the beginning of the experiment:

TABLE I

Results of experiments

| Exp. No. | Gas | 114 min. | 159 min. | 275 min. | 5010 min. |
|---|---|---|---|---|---|
| 1 | Crude | 55.7 | 51.6 | | 33.6 |
| 2 | Acid washed | 66.3 | 66.3 | | 66.9 |
| 3 | Acid washed+$NH_3$ | | | 56.1 | |

It will be noted that with the acid washed gas in experiment #2 the catalyst was just as active at the end of 5000 minutes constant operation as at the end of 114 minutes whereas with the unwashed gas in experiment #1 the activity at the end of 114 minutes was only 84% of that with washed gas and at the end of 5000 minutes it had fallen to approximately 50%.

From the amount of basic substance determined by analysis to be present in the crude gas it was calculated that at the end of experiment #1 only 0.37% of the acid present in the catalyst would have been neutralized. While this in itself is sufficient to establish the effect as one of specific catalyst poisoning rather than mere neutralization it is still further substantiated by the results of experiment #3 wherein 275/114×250 or 602 times the quantity of alkaline material, ammonia, resulted in substantially the same degree of catalyst deterioration as caused by the amount of unknown alkaline material present in the gas of experiment #1. Even in experiment #3 the ammonia present would have neutralized only 5.1% of the acid in the catalyst while the reduction in catalyst activity was of the order of 15%. This appears to indicate that ammonia exerts a poisoning effect in addition to mere neutralization even though far less pronounced than that of the unknown substance.

Since it was significant to continue experiments #1 and #2 only until the catalyst employed with the crude gas had suffered a major reduction in activity, arbitrarily set at about 50%, as compared to the catalyst employed with the purified gas no information was thereby given as to how much longer the catalyst of experiment #2 would have maintained its initial activity. Suffice it to say that in later semi-commercial operation phosphoric acid-film catalysts have remained active after more than 1350 hours (approximately 2 months) of continuous operation under conditions essentially similar to those of experiment #2.

While 5-10% sulfuric acid has been mentioned as a satisfactory acid solution for purifying petroleum cracking gases for polymerization other aqueous acids may be employed so long as the concentration is maintained sufficiently low as not to effect an objectionable amount of olefine absorption and/or polymerization. With sulfuric acid the concentration should in this regard not be above about 50% $H_2SO_4$, while with phosphoric acid it may be 60 to 70% $H_3PO_4$ and with the weakly polymerizing acids even higher concentrations may be employed if desired.

Mention has already been made of the fact that hydrogen sulfide and other volatile acidic sulfur bodies, which are usually present in the gases from petroleum cracking, have been found to have no appreciable adverse effect on the action of a phosphoric acid-film catalyst. Removal of such substances prior to polymerization is thus imperative only where a low sulfur polymer product is desired though it will be preferable in most cases.

The specific means by which such sulfur bodies may be removed is largely immaterial though the position of such step either before or after the dilute acid washing step may be a matter of considerable importance to the over-all economy of the process. For instance, should it be desirable to employ an appreciably volatile agent or should there be a danger of mechanical carry-over of any alkaline material from such step, which would tend to consume acid in the catalyst, it should obviously precede the acid washing step. However, since the alkaline body employed in sulfur removal will usually be materially less volatile than the acid employed to remove the alkaline catalyst poisoning bodies, placing the sulfur removal stage after the acid treatment will tend to give the greatest degree of protection to the catalyst.

When aqueous solutions are employed in the gas purification steps they must, except in such rare cases as they may by proper temperature control be made to give the proper humidity to the gas, precede a final step in which the humidity of the gas is adjusted by appropriate means to correspond to the equilibrium water vapor pressure of the strength of acid desired in the catalyst at the temperature at which polymerization is to be effected. When the acid strengths which have already been given as desirable in a phosphoric acid-film catalyst, from the operable temperature range also previously given and from the following data as to the vapor pressures of phosphoric acids the humidity of gas to be polymerized under any desirable combination of circumstances may be determined.

TABLE II

*Water vapor pressure over phosphoric acid solutions*

| Acid | °F. | Mm. Hg | °F. | Mm. Hg |
|---|---|---|---|---|
| 99.8% $H_3PO_4$, 72.2% $P_2O_5$ | 140 | 0.14 | 400 | 100.0 |
| 109.5% $H_3PO_4$, 79.4% $P_2O_5$ | 230 | 0.04 | 540 | 70.0 |

The complete process of preparing a low sulfur, liquid polymer motor fuel from the olefines contained in petroleum cracking gases by means of a phosphoric acid-film catalyst will thus comprise the steps of washing the gas with a dilute acid solution, of removing acidic sulfur bodies in an alkaline medium, of adjusting the humidity of the gas and subsequently of passing it over the catalyst at atmospheric or higher pressure and at a temperature appropriate both to the composition of the gas and to the specific nature of the product desired but substantially between 50° and 500° F.

While the discussion of this invention has been confined largely to the purification of gases which are to be polymerized by means of phosphoric acid-film catalysts a similar treatment would obviously be equally effective and while possibly somewhat less imperative would still be desirable when other polymerizing catalysts, such as the metal phosphates or phosphoric acid in other specific physical forms are to be employed.

What I claim as my invention is:

1. A process for the production of gasoline boiling liquid hydrocarbons from a mixture consisting substantially of hydrocarbons having less than five carbon atoms per molecule and containing normally gaseous olefine hydrocarbons which comprises contacting said mixture containing said normally gaseous olefine hydrocarbons with a dilute acid solution for the removal of potential catalyst poisoning impurities and subsequently polymerizing said normally gaseous olefine hydrocarbons producing gasoline boiling liquid hydrocarbons in contact with an acidic polymerization catalyst effective to polymerize normally gaseous olefine hydrocarbons to gasoline boiling liquid hydrocarbons.

2. In a process for the catalytic polymerization of normally gaseous olefines to low-boiling liquid motor fuels by means of a strong acid polymerizing agent the step of pretreating the olefine containing raw material with a dilute acid solution.

3. A process for the catalytic production of low-boiling liquid motor fuels from normally gaseous olefine hydrocarbons which comprises the step of contacting an olefine containing raw material with a sulfuric acid containing less than about 50% $H_2SO_4$ for the removal of potential catalyst poisoning impurities prior to contacting said material with a polymerization catalyst comprising an oxy-acid derivative of phosphorus.

4. A process for the catalytic production of low-boiling liquid motor fuels from normally gaseous olefine hydrocarbons which comprises the step of contacting an olefine containing raw material with a sulfuric acid containing less than about 50% $H_2SO_4$ for the removal of potential catalyst poisoning impurities prior to contacting said material with a polymerization catalyst comprising an acid of phosphoric anhydride, $P_2O_5$.

5. A process for the catalytic production of low-boiling liquid motor fuels from normally gaseous olefine hydrocarbons which comprises the step of contacting an olefine containing raw material with a sulphuric acid solution containing less than 50% $H_2SO_4$ for the removal of potential catalyst poisoning impurities prior to contacting said material with a phosphoric acid-film polymerization catalyst.

6. A process for the catalytic production of low-boiling liquid motor fuels from normally gaseous olefine hydrocarbons which comprises the steps of contacting an olefine containing raw material with sulfuric acid more dilute than 50% $H_2SO_4$ and of subsequently contacting said olefine containing material with a phosphoric acid-film polymerization catalyst at a temperature of from 50° to 500° F.

7. A process for the catalytic production of low-boiling liquid motor fuels from normally gaseous olefine hydrocarbons which comprises the steps of contacting an olefine containing raw material with an alkaline substance, with sulfuric acid more dilute than 50% $H_2SO_4$ and finally with a phosphoric acid-film polymerization catalyst at a temperature of from 50° to 500° F.

8. A process for the catalytic production of low-boiling liquids from normally gaseous olefine hydrocarbons which comprises the steps of contacting an olefine containing raw material with an alkaline aqueous solution, with a 5 to 10% sulfuric acid solution and subsequently with a polymerization catalyst comprising a film of 95 to 115% $H_3PO_4$ distributed over the surface of particles of a non-porous inert supporting material.

9. A process for the catalytic production of low-boiling liquid motor fuels from normally gaseous olefine hydrocarbons which comprises the steps of contacting an olefine containing raw material with an alkaline substance for the removal of acidic sulfur containing impurities, with a 5 to 10% sulfuric acid solution for the removal of potential catalyst poisoning impurities and subsequently with a polymerization catalyst comprising a film of 95 to 115% $H_3PO_4$ supported on particles of a non-porous, inert solid material at a temperature of 150° to 400° F.

10. A process for the catalytic production of low-boiling liquid hydrocarbons from normally gaseous olefines which comprises the steps of contacting an olefine containing raw material derived from the cracking of petroleum with an alkaline substance for the removal of acidic sulfur containing impurities, with a dilute acid solution for the removal of alkaline catalyst poisons, of subsequently adjusting the humidity of the gas and of then contacting it with a polymerization catalyst comprising a film of phosphoric acid between 100 and 110% $H_3PO_4$ supported on particles of non-porous quartz.

11. In a process for the catalytic polymerization of normally gaseous olefines to low-boiling liquid motor fuels by means of a phosphoric acid polymerizing agent the step of pretreating the olefine containing raw material with an acid solution of substantially non-polymerizing concentration.

12. In a process for the catalytic polymerization of normally gaseous olefines to low-boiling liquid motor fuels by means of a phosphoric acid polymerizing agent the step of pretreating the olefine containing raw material with an acid of such concentration and under such conditions as do not result in substantial polymerization of said olefines.

ARTHUR L. LYMAN.